(12) United States Patent
Cranford, Jr. et al.

(10) Patent No.: US 9,213,667 B2
(45) Date of Patent: Dec. 15, 2015

(54) SYSTEMS AND METHODS FOR SIGNAL DETECTION

(71) Applicant: International Business Machines Corporation, Armonk, NY (US)

(72) Inventors: Hayden C Cranford, Jr., Cary, NC (US); Daniel M Dreps, Georgetown, TX (US); William R Kelly, Verbank, NY (US)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 13/781,669

(22) Filed: Feb. 28, 2013

(65) Prior Publication Data

US 2014/0149629 A1 May 29, 2014

Related U.S. Application Data

(63) Continuation of application No. 13/685,583, filed on Nov. 26, 2012.

(51) Int. Cl.
*G06F 13/20* (2006.01)
*G06F 13/42* (2006.01)

(52) U.S. Cl.
CPC ...... *G06F 13/423* (2013.01); *G06F 2213/0026* (2013.01); *Y02B 60/1228* (2013.01); *Y02B 60/1235* (2013.01)

(58) Field of Classification Search
CPC .................................................. H03K 5/1532
USPC ......................................................... 710/313
See application file for complete search history.

(56) References Cited

U.S. PATENT DOCUMENTS

| | | | |
|---|---|---|---|
| 6,980,023 B1 * | 12/2005 | Wong et al. | .................... 326/31 |
| 7,017,001 B2 | 3/2006 | Hill et al. | |
| 7,152,136 B1 | 12/2006 | Charagulla | |
| 7,222,290 B2 | 5/2007 | Guo et al. | |
| 7,461,195 B1 | 12/2008 | Woodral | |
| 7,477,077 B1 | 1/2009 | Aude et al. | |
| 7,576,570 B1 | 8/2009 | Wong et al. | |
| 7,698,077 B2 | 4/2010 | Brown et al. | |
| 7,812,591 B1 | 10/2010 | Pan et al. | |
| 7,899,649 B1 | 3/2011 | Wong et al. | |

(Continued)

OTHER PUBLICATIONS

Intel Corporation, PHY Interface for the PCI Express Architecture, Aug. 2008, 45 pages.

(Continued)

*Primary Examiner* — Paul R Myers
(74) *Attorney, Agent, or Firm* — Yudell Isidore PLLC; Parashos Kalaitzis

(57) ABSTRACT

Methods for detecting one or more signals at a PCI Express interface includes receiving, a signal by a receiver at the PCI Express interface. The methods further include identifying one or more data sampling points to set an amplitude threshold. Further, the method includes comparing an amplitude of the received signal with the amplitude threshold. The method also includes confirming that the received signal is a valid signal when the amplitude of the signal is at least one of greater than or equal to the amplitude threshold over a predefined period of time. The method also includes disabling a signal detector of the PCI Express interface to save power. The signal detector is configured to detect one or more low frequency signals; and testing whether the detected signal is correct.

30 Claims, 4 Drawing Sheets

(56) References Cited

U.S. PATENT DOCUMENTS

| | | |
|---|---|---|
| 7,949,809 B2 | 5/2011 | Li et al. |
| 8,005,999 B1 | 8/2011 | Felton et al. |
| 8,184,758 B2 | 5/2012 | Maroni et al. |
| 8,791,691 B2 * | 7/2014 | Cheng .................. 324/140 R |
| 2007/0214301 A1 | 9/2007 | Chen |
| 2008/0080715 A1 | 4/2008 | Lee et al. |
| 2012/0294438 A1 * | 11/2012 | Chen et al. .................. 379/413 |
| 2013/0007489 A1 * | 1/2013 | Unnikrishnan et al. ...... 713/320 |

OTHER PUBLICATIONS

Altera Corporation, Transceiver Configuration in Stratix V DeVices, Jun. 2012, Stratix V Device Handbook, vol. 2, 82 pages.

* cited by examiner

SYSTEMS AND METHODS FOR SIGNAL DETECTION

CROSS-REFERENCE TO RELATED APPLICATION

This application is a continuation of U.S. patent application Ser. No. 13/685,583, filed Nov. 26, 2012, which is incorporated herein by reference in its entirety for all purposes.

FIELD OF THE INVENTION

The present disclosure relates to electronic circuits and more specifically to systems and methods for signal detection in the electronic circuits.

BACKGROUND

Peripheral Component Interconnect (PCI) Express is a computer expansion or laptop expansion bus standard, which is high-speed serial replacement of the older bus standards, such as, but not limited to PCI-X, Accelerated Graphic Port (AGP), and so forth. The PCI Express interface includes a signal detection circuit that may detect whether a valid analog signal has been received at one or more input pins. This operation is based on an assumption that a valid signal produces pulses that may exceed a voltage threshold over a long integration time. This may determine that a signal is a valid signal and not noise. The PCI express interface technology is under constant development and improvement. There are various generations of PCIe i.e. version 1.0a, 1.1, 2.0, 2.1, 3.0, 4.0 that has been released so far, based on their speed bins. Various versions of the PCIe differ from each other based on transfer rate and per-lane data rate. PCIe interface versions have various speed bins for transfer rate. Typically, the transfer rate is expressed in Gigatransfers per second (GT/s) or Gigabits per second (GT/s). The transfer rate of PCIe 1.0 and 1.1 is 2.5 GT/s per lane, for PCIe 2.0 and 2.1 is 5 GT/s per lane, for PCIe 3.0 is 8 GT/s per lane, and for PCIe 4.0 is 16 GT/s per lane.

The existing signal detecting techniques are based on level sensing and simple envelope integration and cannot detect a valid signal as speed approaches to 8 GT/s per lane or 16 GT/s per lane. Therefore, an operator or user opts to disable this function of signal detection and ignore it when speed approaches 8 GT/s or 16 GT/s per lane. Because of this limitation, existing signal detection techniques are being used only at slower speeds and initialization.

In light of above discussion and limitations of existing signal detection techniques, there exists a need for systems and methods for detecting signal at higher speeds.

BRIEF SUMMARY

An embodiment of the present disclosure provides a method for detecting one or more signals at a PCI Express interface. The method includes receiving, by a receiver, a signal at the PCI Express interface. The method further includes identifying one or more data sampling points to set an amplitude threshold. Further, the method includes comparing an amplitude of the received signal with the amplitude threshold. The method further includes confirming that the received signal is a valid signal when the amplitude of the signal is at least one of greater than or equal to the amplitude threshold over a predefined period of time. The method also includes disabling a signal detector of the PCI Express interface to save power. The signal detector is configured to detect one or more low frequency signals; and testing whether the detected signal is correct.

Another embodiment of the present disclosure provides a power saving signal detection method. The method includes receiving, by a receiver, a signal at a PCI Express interface, wherein a receiver receives the signal. The method further includes identifying, by a peak detector, one or more data sampling points to set an amplitude threshold. The method also includes comparing, by a comparator, an amplitude of the received signal with the amplitude threshold. The method further includes confirming, by a processor, that the received signal is a valid signal when the amplitude of the signal is at least one of greater than or equal to the amplitude threshold over a predefined period of time. The method also includes disabling, by the processor, a signal detector (SIGDET) of the PCI Express interface to save power. The signal detector (SIGDET) is configured to detect one or more low frequency signals.

BRIEF DESCRIPTION OF THE SEVERAL VIEWS OF THE DRAWINGS

Figure 1:
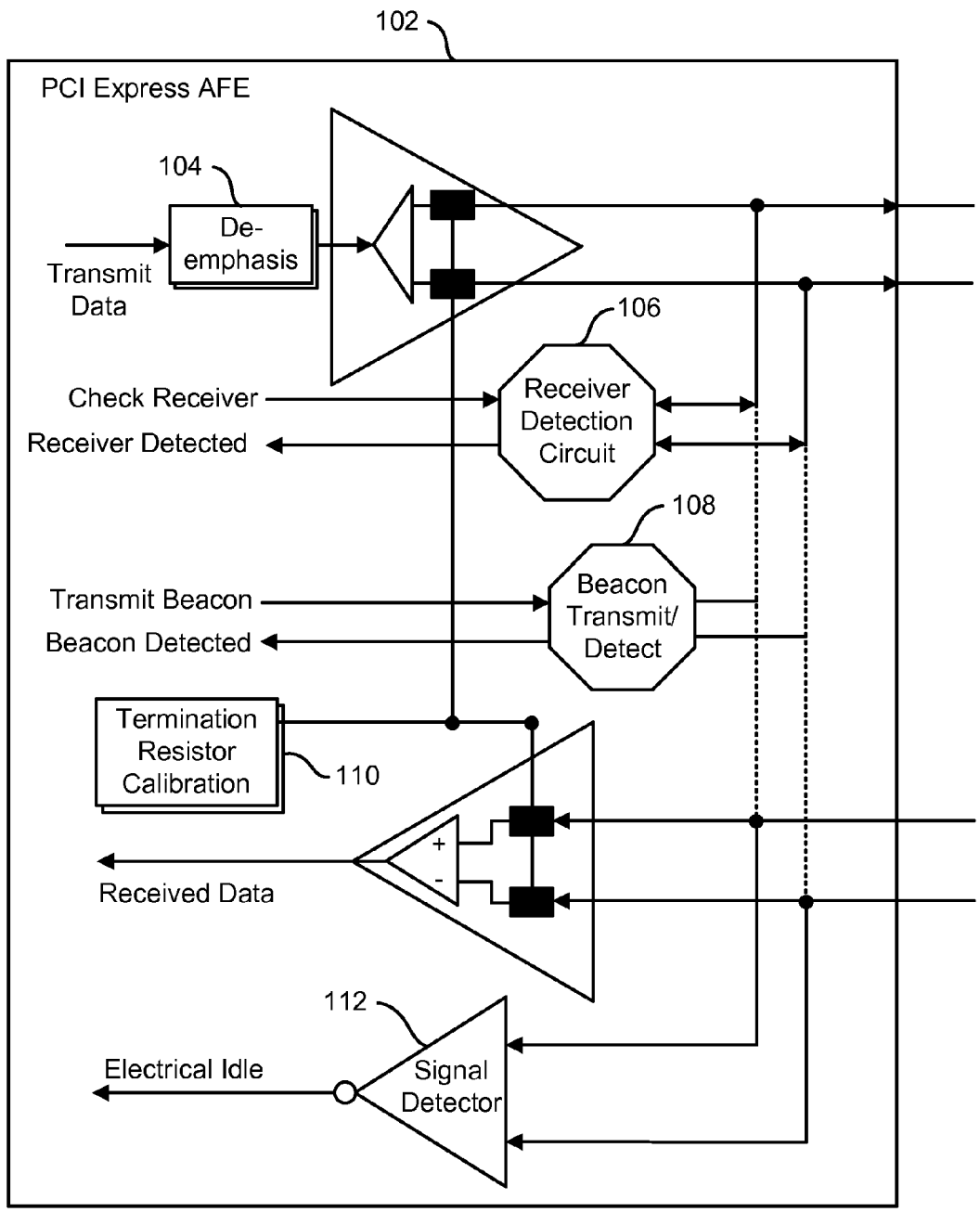
Figure 2:
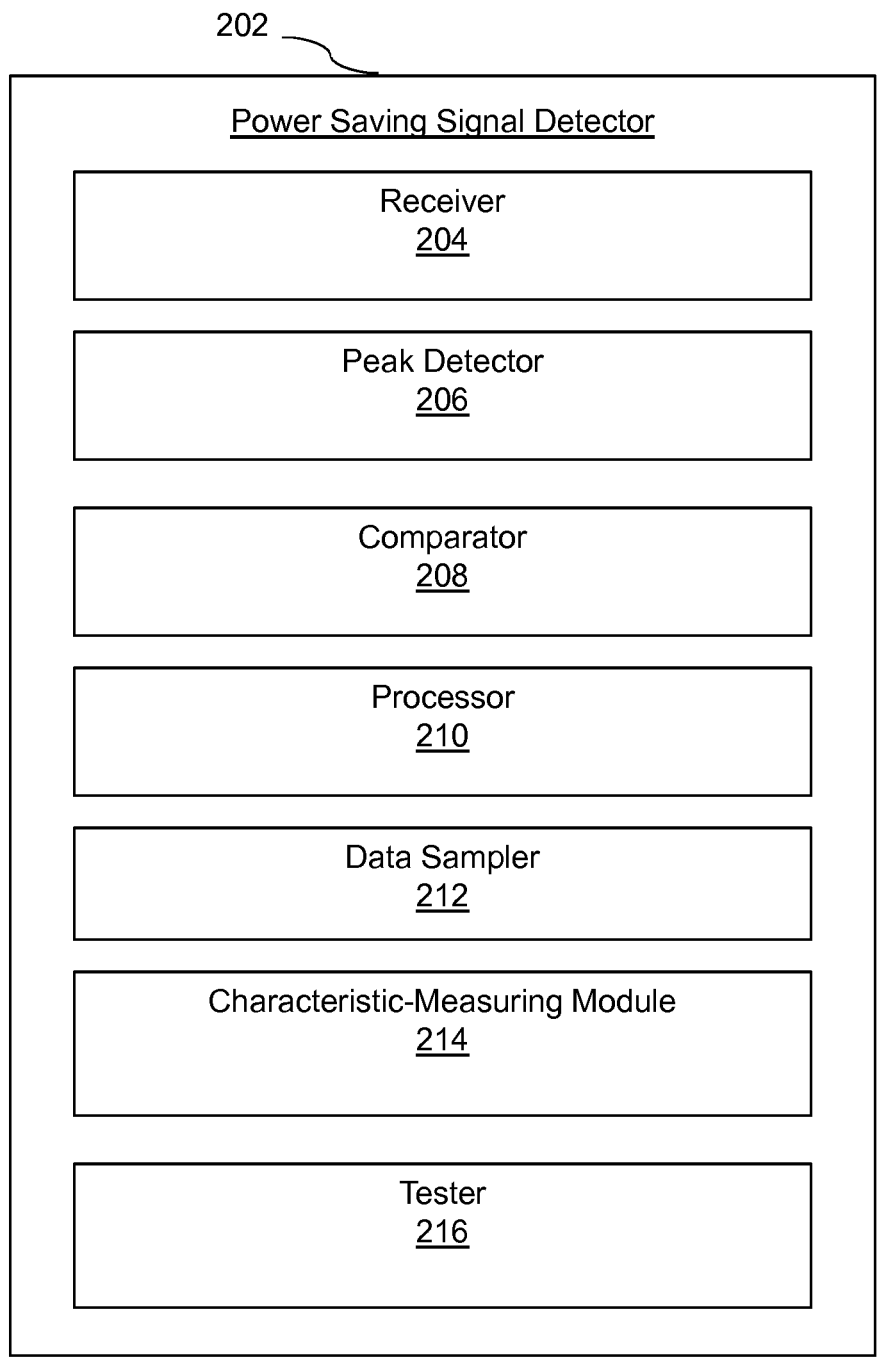
Figure 3A:
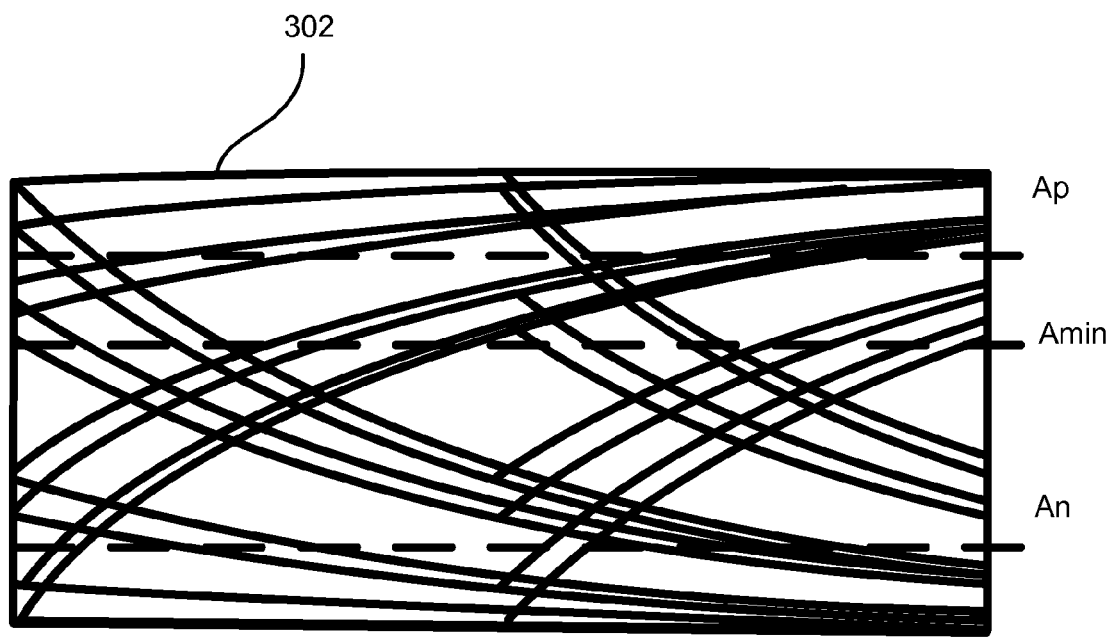
Figure 3B:
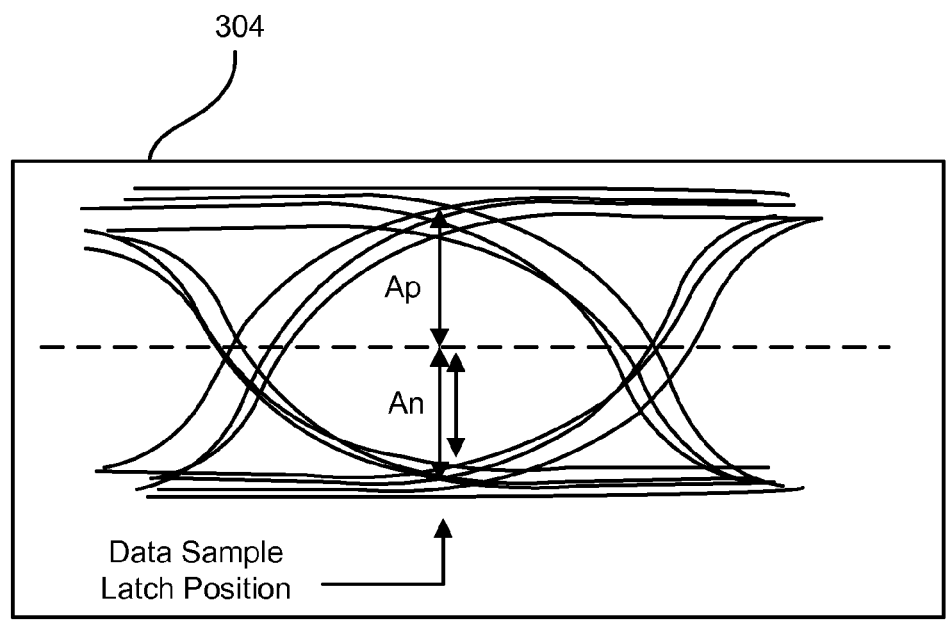
Figure 4:
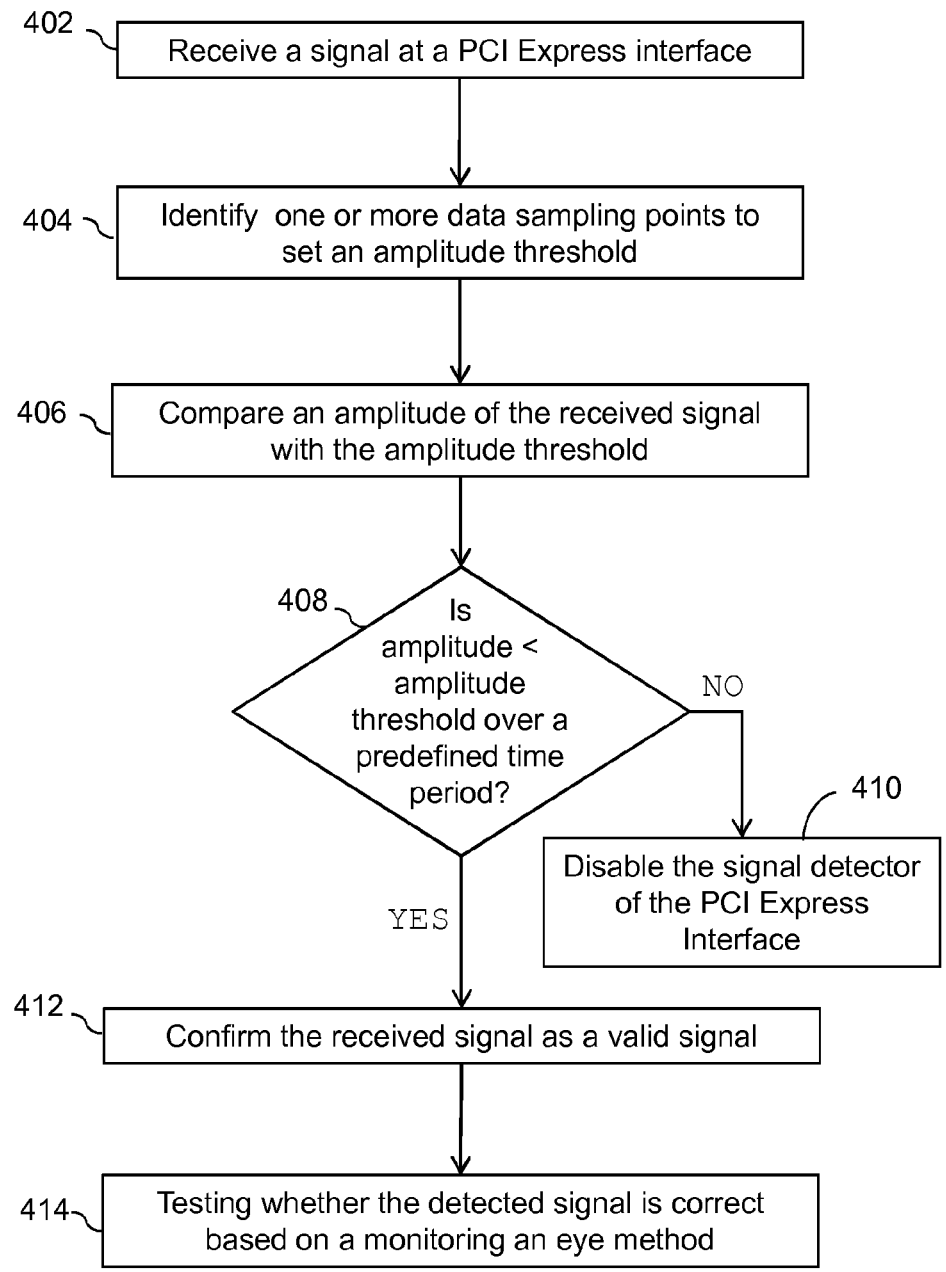

Having thus described the invention in general terms, reference will now be made to the accompanying drawings, which are not necessarily drawn to scale, and wherein:

FIG. 1 illustrates an exemplary PCI Express interface, where various embodiments of the present disclosure may function;

FIG. 2 illustrates exemplary structural components of a power saving signal detector, in accordance with various embodiments of the present disclosure;

FIG. 3A illustrates a measurement of Ap, An, and Amin on random data input "eye" diagram;

FIG. 3B illustrates an eye diagram monitored by a tester, in accordance with an embodiment of the present disclosure; and FIG. 4 depicts a flowchart diagram illustrating a method for detecting a valid signal in the PCI Express interface, in accordance with an embodiment of the present disclosure.

DETAILED DESCRIPTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, RF cable, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the shopper's computer, partly on the shopper's computer, as a stand-alone software package, partly on the shopper's computer and partly on a remote computer or entirely on the remote computer or server. In the latter scenario, the remote computer may be connected to the shopper's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures and in particular with reference to FIG. 1, exemplary diagram of an exemplary shopping assistance system is provided in which illustrative embodiments may be implemented. It should be appreciated that FIG. 1 is only exemplary and are not intended to assert or imply any limitation with regard to the environment in which different embodiments may be implemented. Many modifications to the depicted environment may be made.

FIG. 1 illustrates an exemplary PCI Express interface 102, where various embodiments of the present disclosure may function. As shown, the PCI Express interface 102 may include a de-emphasis circuit 104, a receiver detection circuit 106, a beacon transmit/detect circuit 108, a termination/resistor calibration circuit 110, and a signal detector 112 (or SIGDET 112), and so forth. The de-emphasis circuit 104 may be configured to minimize the signal to noise ratio of one or more signals received at the PCI Express interface 102. The receiver detection circuit 106 may be configured to receive one or more signals at the PCI Express interface 102. The beacon transmit/detect circuit 108 may be configured to transmit one or more signals to other electronic circuits. The termination/resistor calibration circuit 110 may be configured to introduce a pure resistance of a known value to calibrate a frequency-domain transmitter and/or receiver (such as receiver detection circuit 106). In some embodiments, the termination/resistor calibration circuit 110 may provide resistance of known value to calibrate frequency domain beacon transmit/detect circuit 108 and/or a receiver detection circuit 106.

The SIGDET 112 may detect a valid signal at low frequency or low transfer rate. Typically, there may be different versions of the PCI Express interface 102, i.e. PCIe 1.0, 1.1, 2.0, 2.1, 3.0, and 4.0. The transfer rate of PCIe 1.0 and 1.1 is 2.5 GT/s per lane, for PCIe 2.0 and 2.1 is 5 GT/s per lane, for PCIe 3.0 is 8 GT/s per lane, and for PCIe 4.0 is 16 GT/s per lane. The SIGDET 112 is capable of detecting a valid signal only at low transfer rate or frequency such as, at transfer rate of 2.5 GT/s per lane, and 5 GT/s per lane. The SIGDET 112 may not be capable of detecting a valid signal at higher transfer rate of 8 GT/s per lane or above.

The present disclosure provides a power saving signal detection system or method to detect a valid signal at higher frequency or transfer rate i.e. 8 GT/s and 16 GT/s per lane. The power saving signal detection system may use the existing circuitry of the PCI Express interface 102 to detect the valid signal. The SIGDET 112 may be disabled at higher transfer rate or frequencies and an alternate available circuit i.e. the power saving signal detector may be used to detect or confirm that a valid signal is present at the PCI Express interface 102. The SIGDET 112 may be re-enabled at lower frequency or lower transfer rate, therefore the user or operator can quickly recognize when the signal returns.

The present disclosure provides a method and power saving signal detector (shown in FIG. 2) to determine the presence of a valid signal at input pins of the PCI Express interface 102. The power saving signal detector may be used to detect one or more signals for all channels and speeds (even high speeds). In an embodiment, the power saving signal detector may be implemented using the existing circuitry of the PCI Express interface 102. A user or operator may still keep the old design SIGDET 112 for slow speeds and disable the SIGDET 112 for higher speeds such as for 8 GT/s per 16 GT/s per lane (or 8 GB and 16 GB). In some embodiments, the PCI Express interface 102 may be based on level sensitive concept using sideband means.

Further, the one or more signals and the signal received at the PCIe interface 102 may be an analog signal. In some embodiments, the analog signal(s) may be received at a PCI Express Analog Front End (AFE).

FIG. 2 illustrates exemplary structural components of a power saving signal detector 202, in accordance with various embodiments of the present disclosure. As discussed with reference to FIG. 1, the power saving signal detector 202 may be configured to detect a valid signal at the PCIe interface 102. In an embodiment, the power saving signal detector 202 may be implemented using the existing circuitry or one or more modules of the PCIe interface 102 (or PCI Express AFE). The power saving signal detector 202 may include a receiver 204, a peak detector 206, a comparator 208, a processor 210, a data sampler 212, a characteristic-measuring module 214, and a tester 216. The receiver 204 may be configured to receive one or more signals such as, analog signals at the PCI Express interface 102 (or the PCI Express AFE 102). Each of the one or more signals has associated one or more characteristics such as, but not limited to, amplitude, frequency, phase (or timing), and so forth.

The peak detector 206 may be configured to detect one or more signals based on level sensing. This means the peak detector 206 may detect the one or more signals by sensing or monitoring an amplitude or level of the one or more signals. The peak detector 206 may further be configured to identify one or more data sampling points to set an amplitude threshold. The data sampling point may be identified by using a circuitry including a digital to analog convertor (DAC) coupled to a sampling latch having an 8 bit resolution (1 sign bit, 7 magnitude bits), providing +/−127 steps of adjustment range.

Further, the comparator 208 may be configured to compare amplitude of the received signal with the amplitude threshold. Based on the comparison, the processor 210 may confirm a signal as a valid signal or an invalid signal. An invalid signal is a signal in which the signal to noise ratio is more. When the amplitude of the signal is either greater or equal to the amplitude threshold over a predefined period of time, then the processor 210 may confirm that the received signal is a valid signal and not noise. In some embodiments, a user or an operator may define the predefined period of time. The processor 210 may further disable the SIGDET 112 to save power, when high frequency signals or high transfer rate signals are received at the PCIe interface 102 based on the comparison by the comparator 208. The SIGDET 112 may be configured or enabled only to detect one or more signals at low frequency and low transfer rate, for example, signals having a transfer rate of at 2.5 GT/s per lane, 5 GT/s per lane (or 2.5 GB, 5 GB). Further, the processor 210 may be configured to set a new amplitude threshold value when the amplitude of the signal is less than the amplitude threshold. The new amplitude threshold value is half of the previous amplitude threshold value. For example, if an amplitude threshold is 16 then new amplitude threshold may be set as 8 by the processor 210. Then, the comparator 208 may compare the amplitude of the signal with the new amplitude threshold. The processor 210 may be configured to enable the SIGDET 112 for detecting one or more valid signals when the amplitude of the signal is less than the new amplitude threshold. The processor 210 is further configured to adjust the amplitude of the signal when the amplitude of the signal is less than at least one of the amplitude threshold and the new amplitude threshold.

The power saving signal detector 202 may further include the tester 216 configured to test whether the detected signal is correct or not. In an embodiment, an eye quality monitor (EQM) circuit may test whether the detected signal is correct based on a "monitoring an eye" method. The EQM circuit may monitor an eye pattern or eye diagram to measure or analyse one or more characteristics of the signals or data samples. The data sampler 212 may be configured to sample one or more signals to identify one or more data samples using a digital to analog convertor (DAC) coupled to a sampling latch. In an embodiment, the data samples may be identified using a circuit including multiple DAC and multiple sampling latches. In an embodiment, the sampling latch is a delayed sampling latch (D− sampling latch). The output voltage of the DAC may be applied to the (−) reference input of a circuit (such as the comparator 208) on the D input of the sampling latch. The input signal (received signal) may be applied to the (+) input of this circuit. In such a configuration, the sampling latch may input a logic '1', whenever the input signal is greater than the DAC output voltage, and may be logic '0' otherwise.

Further, the characteristic-measuring module 214 may be configured to measure one or more characteristics, such as amplitude etc., of the one or more signals and the received signal. The signals can be analog signals. The characteristic-measuring module 214 may measure one or more characteristics of the signals (such as analog signals) by adjusting an offset applied by the DAC associated with each sample latch, and monitoring the results captured by the sampling latch. The characteristic-measuring module 214 may further adjust the offset applied by the digital to analog convertor (DAC) associated with each of the sample latches. The characteristic-measuring module 214 is further configured to monitor the one or more results captured by the sampling latch. The characteristics-measuring module 214 is further configured to measure an Ap and an An value based on the one or more data samples. In an embodiment, the Ap and An values are measures of the average amplitudes of 1 and 0 respectively for the one or more data samples.

Further, the characteristic-measuring module 214 may measure all necessary signal attributes or characteristics by using any suitable algorithm including a timing control and one or more qualification criteria. For example, the technique of adjusting offset of DAC may be used to measure the average amplitude of '1's received at the (+) input of the sampling latch. This may be referred to as the "Ap measurement", and may be implemented by an algorithm which serves the applied DAC offset to produce a 50/50 balance of '1' and '0' samples obtained while sampling an applied active data pattern (e.g. PRBS23). Further, the PRBS may be a data stream, which is free running, and self-synchronous. The PRBS23 refers to a 23rd order PRBS monitor that can lock onto the PRBS sequence once it has accumulated 23 bits.

Further, the characteristic-measuring module 214 may qualify one or more data samples based on one or more qualification criteria. For example, a qualification criterion may qualify one or more sample(s) that has known '1's, and further, only samples of known '1's may be allowed to adjust the DAC value. In some embodiment, if a qualified '1' is captured as a '0', then the DAC value may be considered as too high, and the characteristic-measuring module 214 may decrement the DAC offset. In other embodiments, if a qualified '1' is captured as a '1', then the DAC value may be considered as too low, and the characteristic-measuring module 214 may increment offset of the DAC. Further, when the sample is not qualified, then no useful information may be concluded from the sample, and the DAC value remains unchanged. Therefore, over the course of numerous (1000's) samples taken in this manner, the DAC value may converge to the correct value to achieve the 50/50 balance of observed '1' and '0' samples for the known '1' values applied. In some embodiments, by altering the qualification criteria, this algorithm can be used to converge the measurement for various criteria, thus making the desired measurement of the one or more characteristics of the signal(s). For measuring the average amplitude of known '0's received, the qualification criteria may be changed to look for known '0's instead of '1's, and repeat the same process as mentioned above FIG. 3A illustrates a measurement of Ap, An, and Amin on random data input "eye" diagram 302. The eye diagram 302 (or eye pattern) is a display from the EQM circuit in which a signal from the receiver 204 may be repetitively sampled and applied to the vertical input. Further, the data rate may be used to trigger the horizontal sweep in the eye diagram 302. The eye diagram 302 may be used to analyze several system performance measures such as amplitude, time, and so forth. If the signals are to short, too long, poorly synchronized with the system clock, too high, too low, too noisy, or too slow to change, or have too much undershoot or overshoot, this can be observed from the eye diagram 302. An open eye pattern may indicate minimum noise in signal or minimal signal distortion. In addition, a closed eye diagram may indicate distortion of the signal waveform due to inter-symbol interference and noise.

In an embodiment, to measure Amin, the qualification criterion may be little more complicated, but the process is still the same. As discussed with reference to FIG. 2, the characteristic-measuring module 214 may be configured to measure one or more characteristics of the signals. Typically, the confidence level is a sample size calculator and may indicate how sure one should be about a data sample. The confidence level is usually expressed in percentage and may represent how often the true percentage of the population or sample that may pick an answer lies within the confidence level. For example, a 95% confidence level means one can be 95% certain. For measuring Amin, the characteristic-measuring module 214 may look for a 1e-3 confidence level (which is equivalent to a 3.09 sigma detection for the case of Gaussian noise) on the amplitude of known '1's received (Ap is set to a 0.5 confidence level). This may be implemented using a secondary counter, which may be incremented each time a sample having '1' for a known '1' is detected or sensed. When this secondary counter reaches 1023 (10 bit max value), the characteristic-measuring module 214 may increment the DAC value and reset this second counter. In an embodiment, when a sample having '0' for a known '1' is sensed or detected, the characteristic-measuring module 214 may reset the secondary counter, and may decrement the DAC value.

In an embodiment, a baud rate clock & data recovery system may be configured to identify data sampling points and measure Ap and An.

Further, the characteristic-measuring module 214 may recognize sudden loss of input signal amplitude by using the method of measuring Ap and An (as explained above in FIGS. 2 & 3A) with slight modification. Further, Ap and An may be measures of the average amplitudes of '1' and '0' bits respectively. For purposes of signal detection, a sudden loss of signal amplitude may cause the measurements to see all "decrements" and no "increments" to their respective magnitudes. By using this logic, the characteristic-measuring module 214 (or the operator or the user) may recognize this situation over periodic intervals, and take additional action when indicated. For example, if an Ap measurement interval produced all "decrements" the characteristic-measuring module 214 may move to a new measurement interval using ½ Ap as the threshold, and look for "increment" signals to occur. If no increment signal(s) are detected then this may indicate that the amplitude of the signal has dropped dramatically. In such an embodiment, the processor 210 may re-enable the SIGDET 112 by asserting SIGDET='1'. For a link or circuit (such as the interface 102) running normally, the disclosed signal detector 202 may disable the SIGDET 112, 100% of the time whenever high frequency signals are detected, hence power may be saved. The processor 210 may enable the SIGDET 112 powered on during initial bring-up and speed negotiation, then again only if the link or circuit went down.

FIG. 3B illustrates an eye diagram 304 monitored by the tester 216 (as shown in FIG. 2), in accordance with an embodiment of the present disclosure. In an embodiment, the real time signal eye 304 may be sensed by monitoring Ap and An by using a decision feedback equalizer (DFE). In an embodiment, this monitoring and sensing of the signal eye 304 may be based on actual serial link data or input, as opposed to a "test mode" or sensing of a special test data. Therefore, this may provide a more realistic loss of signal indicator at the point where bit error rate (BER) is determined (i.e. at the sample latch). After the link (or circuit or interface 102) is powered up and all functions are converged (e.g. Automatic Gain Control (AGC), DFE, etc.) a test signal could be used, so that it is not precluded. Further, In some embodiments, the PCIe interface 102 does not require a traditional DFE, clock & data recovery (CDR) system for functioning power saving signal detector 202. In an embodiment, a baud rate CDR (such as the Mueller-Muller phase detector) system may be used to "find" the data sampling point(s) (as opposed to an edge finding design), and in turn measure Ap and An. In some embodiments, other forms of "lane sparing" link designs may also be used with the proposed design of power saving signal detector 202.

Further, the signal levels required to sense the Ap and An levels may be adjusted by the characteristic-measuring module 214 to introduce additional function including maintaining an active link or interface with low Ap and An values, as long as BER is not impacted. The amount of digital filtering before action may be taken to activate a loss of signal indicator can also be modified. This may lead to the concept of keeping a link "alive" in a so-called "limp along" mode in which some data may be transmitted at an increased BER. This may allow BER to transition to, for example, 1e-10 from 1e-12, 1e-15, or 1e-18 (the normally allowable BER's) if signal transmission conditions worsen (for example outside interferers). Orderly system shutdown or reduced effective data rates (while service has been called) may be possible, where with traditional signal detect circuits 112 this may not be possible. Alternatively, the proposed signal detection system may be configured to sense the low Ap and An values and switch to a lower speed data rate at which Ap and An would now be sufficient.

FIG. 4 is a flowchart diagram illustrating a method for detecting a valid signal in the PCI Express interface, in accordance with an embodiment of the present disclosure. As discussed with reference to FIGS. 1, 2, 3A and 3B, the PCIe interface 102 may receive one or more signals (analog signals) at one or more input pin(s). The power saving signal detector 202 may then confirm whether the received signal is a valid signal or invalid (i.e. noise). Further, the tester 216 may test or check whether the signal detection is correct or not.

At step 402, a signal may be received at a PCIe interface 102 (or PCIe AFE 102). In an embodiment, the receiver 204 may receive the signal(s) at input pins of the PCIe interface 102. At step 404, one or more data sampling points may be identified to set an amplitude threshold. In an embodiment, the peak detector 206 may further be configured to identify one or more data sampling points to set an amplitude threshold. The data sampling point may be identified by using a circuitry including a digital to analog convertor (DAC) coupled to a sampling latch having an 8 bit resolution (1 sign bit, 7 magnitude bits), providing +/−127 steps of adjustment range.

At step 406, amplitude of the received signal may be compared with the amplitude threshold. In an embodiment, the comparator 208 may compare the amplitude with the amplitude threshold. At step 408, it is checked whether the amplitude is greater than or equal to the amplitude threshold over a predefined period of time. If the amplitude is less than the amplitude threshold this means the signals are received at lower frequency and lower transfer rate, therefore SIGDET 112 may continue detecting signals. If the amplitude is greater than the amplitude threshold then this means signals have high frequency and high transfer rate, and step 410 may be followed. At step 410, the processor 210 may disable the SIGDET 112. At step 412, the processor 210 may confirm the received signal as a valid signal. Thereafter, at step 414, the tester 216 may test whether the detected signal is correct or not based on a monitoring eye method (as explained above in FIGS. 3A-3B). In an embodiment, an EQM circuit may be used to test whether the signal detected is correct or not. The EQM circuit may be an on chip, and is configured to measure eye width and eye height.

Embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general-purpose computers, special purpose computers, or other programmable data processing translator to produce machines, such that the instructions, which execute on the computers or other programmable data processing translator create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims. The invention has been described in the general context of computing devices, phone and computer-executable instructions, such as program modules, being executed by a computer. Generally, program modules include routines, programs, characters, components, data structures, etc., that perform particular tasks or implement particular abstract data types. A person skilled in the art will appreciate that the invention may be practiced with other computer system configurations, including hand-held devices, multiprocessor systems, microprocessor-based or programmable consumer electronics, network PCs, mini-computers, mainframe computers, and the like. Further, the invention may also be practiced in distributed computing worlds where tasks are performed by remote processing devices that are linked through a communications network. In a distributed computing world, program modules may be located in both local and remote memory storage devices.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the various embodiments of the present invention has been presented for purposes of illustration, but is not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for detecting one or more signals at a PCI Express interface, the method comprising:
   receiving a signal at the PCI Express interface, wherein a receiver receives the signal;
   identifying one or more data sampling points to set an amplitude threshold;
   comparing an amplitude of the received signal with the amplitude threshold;
   confirming that the received signal is a valid signal when the amplitude of the signal is at least one of greater than or equal to the amplitude threshold over a predefined period of time;

disabling a signal detector of the PCI Express interface to save power, wherein the signal is configured to detect one or more low frequency signals; and testing whether the detected signal is correct.

2. The method of claim 1, wherein the signal is received at a PCI Express analog front end (AFE) circuit.

3. The method of claim 2, wherein the received signal and the one or more signals are analog signals.

4. The method of claim 3 further comprising sampling the one or more signals to identify one or more data samples using a digital to analog convertor (DAC) coupled to a sampling latch, wherein the sampling latch is a delayed sampling latch (D-sampling latch).

5. The method of claim 4, further comprising measuring one or more characteristics of the one or more signals and the received signal.

6. The method of claim 5, wherein measuring the one or more characteristics further comprises:
adjusting an offset applied by the digital to analog convertor associated with each sample latch; and
monitoring the one or more result captured by the sampling latch.

7. The method of claim 6 further comprising measuring an Ap and a An value based on the one or more data samples, wherein Ap and An values are measures of the average amplitudes of 1 and 0 respectively for the one or more data samples.

8. The method of claim 7 further comprising setting a new amplitude threshold value when the amplitude of the signal is less than the amplitude threshold, wherein the new threshold value is half of the amplitude threshold value.

9. The method of claim 8 further comprising comparing the amplitude of the signal with the new amplitude threshold.

10. The method of claim 9 further comprising enabling the signal detector for detecting one or more valid signals when the amplitude of the signal is less than the new amplitude threshold.

11. The method of claim 10 further comprising adjusting the amplitude of the signal when the amplitude of the signal is less than at least one of the amplitude threshold and the new amplitude threshold.

12. The method of claim 11, wherein the one or more signals are detected based on level sensing by a peak detector.

13. The method of claim 12, wherein a baud rate clock & data recover system is used to identify data sampling points and measure the AP and An values.

14. The method of claim 13 further comprising qualifying the one or more data samples based on one or more qualification criteria.

15. The method of claim 14, wherein testing whether the detected signal is correct is based on a "monitoring an eye" method, further wherein an eye quality monitor circuit monitors the eye.

16. A power saving signal detection method comprising:
receiving, by a receiver, a signal at a PCI Express interface, wherein a receiver receives the signal;
identifying, by a peak detector, one or more data sampling points to set an amplitude threshold;
confirming, by a comparator, an amplitude of the received signal with the amplitude threshold;
confirming, by a processor, that the received signal is a valid signal when the amplitude of the signal is at least one of greater than or equal to the amplitude threshold over a predefined period of time; and
disabling, by the processor, a signal detector of the PCI Express interface to save power, wherein the signal detector is configured to detect one or more low frequency signals.

17. The method of claim 16, wherein the signal is received at a PCI Express analog front end (AFE) circuit.

18. The method of claim 17, wherein the received signal is an analog signal.

19. The method of claim 18 further comprising sampling, by a data sampler, one or more signals to identify one or more data samples using a digital to analog convertor (DAC) coupled to a sampling latch, wherein the sampling latch is delayed sampling latch (D– sampling latch).

20. The method of claim 19 further comprising measuring, by a characteristic-measuring module, one or more characteristics of the one or more signals and the received signal.

21. The method of claim 20, wherein measuring the one or more characteristics further comprises:
adjusting, by the characteristic-measuring module, an offset applied by the digital to analog convertor associated with each sample latch; and
monitoring, by the characteristic-measuring module, the one or more result captured by the sampling latch.

22. The method of claim 21 further comprising measuring, by the characteristic-measuring module, an Ap and an An value based on the one or more data samples, wherein the Ap and An values are measures of the average amplitudes of 1 and 0 respectively for the one or more data samples.

23. The method of claim 22 further comprising setting, by the processor, a new amplitude threshold value when the amplitude of the signal is less than the amplitude threshold, wherein the new threshold value is half of the amplitude threshold value.

24. The method of claim 23 further comprising comparing, by the comparator, the amplitude of the signal with the new amplitude threshold.

25. The method of claim 24 further comprising enabling, by the processor, the signal detector for detecting one or more valid signals when the amplitude of the signal is less than the new amplitude threshold.

26. The method of claim 25 further comprising adjusting, by the processor, the amplitude of the signal when the amplitude of the signal is less than at least one of the amplitude threshold and the new amplitude threshold.

27. The method of claim 26, wherein the one or more signals are detected based on level sensing by the peak detector.

28. The method of claim 27, wherein a baud rate clock & data recover system is used to identify data sampling points and measure the AP and An values.

29. The method of claim 28 further comprising qualifying, by the characteristic-measuring module, the one or more data samples based on one or more qualification criteria.

30. The method of claim 29 further comprising testing, by a tester, whether the signal detected is correct, based on a "monitoring an eye" method, further wherein an eye quality monitor circuit monitors the eye.

* * * * *